No. 781,243. Patented January 31, 1905.

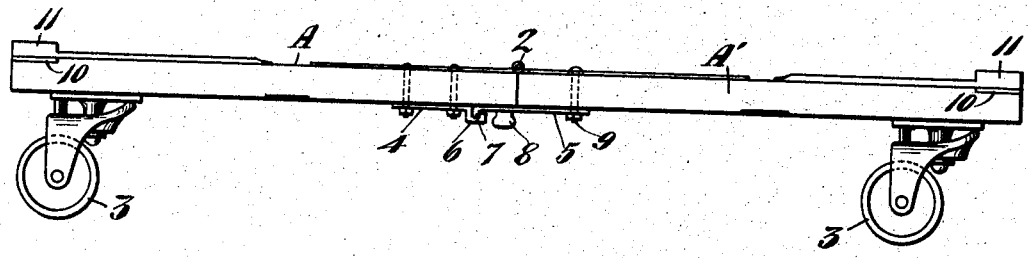
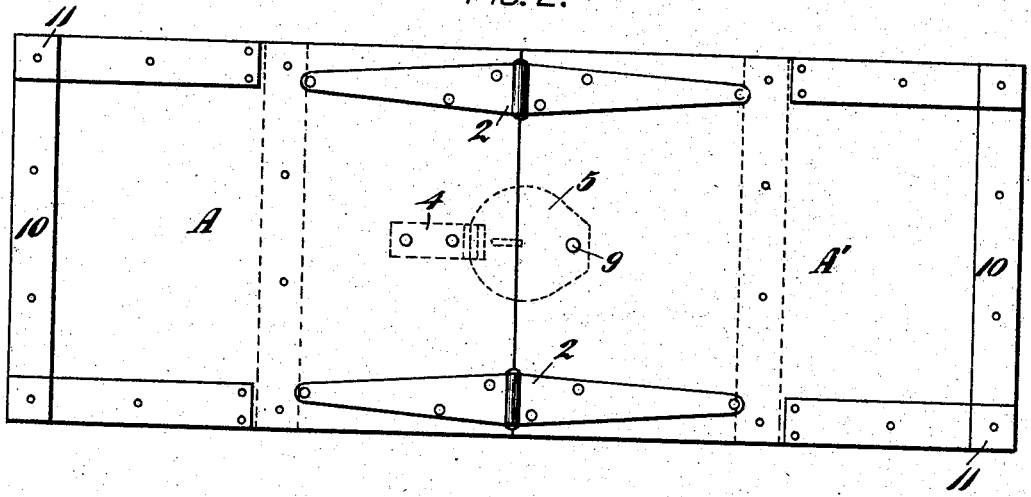
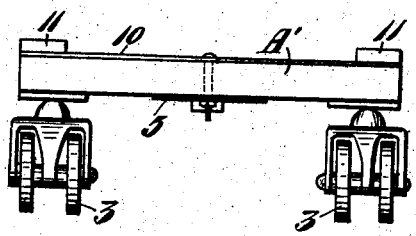

UNITED STATES PATENT OFFICE.

SEDGEFIELD THOMPSON, OF EUREKA, CALIFORNIA.

FOLDABLE TRUCK.

SPECIFICATION forming part of Letters Patent No. 781,243, dated January 31, 1905.

Application filed October 12, 1904. Serial No. 228,094.

*To all whom it may concern:*

Be it known that I, SEDGEFIELD THOMPSON, a citizen of the United States, residing at Eureka, in the county of Humboldt and State of California, have invented new and useful Improvements in Foldable Trucks, of which the following is a specification.

My invention relates to an improved foldable truck.

Its object is to provide a light, handy, compact, durable, practical truck for the use of expressmen and others in the easy handling of trunks, boxes, and like bulky packages, and which truck can be folded into small compass and stowed into a wagon, and which also can easily be run over carpets or polished floors without danger of injury to the latter.

The invention consists of the parts and the construction and combination of parts, as hereinafter more fully described and claimed, having reference to the accompanying drawings, in which —

Figure 1 is a side elevation of a foldable truck embodying my invention. Fig. 2 is a top plan view of the same. Fig. 3 is an end view.

A A' represent two flat platform-sections hinged together on their upper side, as shown at 2, so that the two sections may be folded over one upon the other into parallel planes or opened out into the same horizontal plane. The outer ends of each section are supported on swiveled, preferably rubber-shod, casters 3, and suitable means may be provided on the under side of the two sections and adjacent to their meeting edges to maintain the sections in alinement when the device is being operated as a truck.

In the present instance I have shown the hasp members 4 5, the one, 4, secured to the section A and having a U-shaped end flange 6, with which the downwardly-turned flange 7 on the hasp member 5 is adapted to engage.

The member 5 is pivoted to the section A' and is worked back and forth either way to engage the hasp 4 by means of the thumbpiece 8.

The easiness with which the part 5 may be turned can be regulated by means of a nut on the pivot-bolt 9.

Since this truck when opened out is usually not over twenty-two inches long by about nine inches wide, comparatively little strain is brought on the middle portion of the platform over the hinge, the principal weight being sustained immediately over the casters.

By hinging the device on top and providing the simple locking means 4 5 on the under side the truck can be folded into very small compass with the wheels on the outside, and the entire device can be tucked under the arm and carried without inconvenience or can be stowed away in a very small space in a loaded wagon.

Where the platform-sections are made of wood, the ends may be reinforced on top by the metal straps 10, and in order to lessen the jar when a trunk or box is laid on the truck the corners of the sections on top may be provided with leather or equivalent pads 11.

Having thus described my invention, what I claim, and desire to secure by Letters Patent, is—

1. A truck having foldable platform-sections hinged on their upper adjacent edges, and adapted to be folded into parallel planes and means on the under side of the sections for maintaining them in alinement.

2. A foldable truck having hinged sections foldable into parallel planes, and interlocking means on their under side to maintain them in alinement, said locking means comprising a member on one section having a substantially U-shaped end flange, and a movable part on the other section engageable with said flange.

3. A foldable truck having hinged sections foldable into parallel planes, and interlocking means on their under side to maintain them in alinement, said locking means comprising a member on one section having a substantially U-shaped end flange and a pivoted plate on the other section having a downwardly-turned flange engaging said U-shaped flange.

4. A truck having foldable platform-sections hinged on their upper adjacent edges whereby the platform may be folded into substantially parallel planes, rubber-shod casters supporting the sections, means on the under side of the sections to maintain them in alinement and leather or like pads on the upper surface of the sections.

In testimony whereof I have hereunto set my hand in presence of two subscribing witnesses.

SEDGEFIELD THOMPSON.

Witnesses:
  JAMES YUILL,
  A. W. HILL.